United States Patent
Zhao et al.

(10) Patent No.: US 9,521,626 B2
(45) Date of Patent: Dec. 13, 2016

(54) METHOD AND DEVICE FOR REPORTING CONFIGURABLE MAXIMUM TRANSMISSION POWER OF UE CARRIER

(75) Inventors: Yali Zhao, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 369 days.

(21) Appl. No.: 14/002,116

(22) PCT Filed: Nov. 4, 2011

(86) PCT No.: PCT/CN2011/081797
§ 371 (c)(1),
(2), (4) Date: Aug. 28, 2013

(87) PCT Pub. No.: WO2012/059070
PCT Pub. Date: May 10, 2012

(65) Prior Publication Data
US 2014/0016555 A1    Jan. 16, 2014

(30) Foreign Application Priority Data

Nov. 5, 2010 (CN) .......................... 2010 1 0537982

(51) Int. Cl.
| H04W 4/00 | (2009.01) |
| H04L 12/28 | (2006.01) |
| H04W 52/04 | (2009.01) |
| H04W 24/10 | (2009.01) |
| H04W 52/36 | (2009.01) |

(52) U.S. Cl.
CPC ............. *H04W 52/04* (2013.01); *H04W 24/10* (2013.01); *H04W 52/365* (2013.01); *H04W 52/367* (2013.01); *Y02B 60/50* (2013.01)

(58) Field of Classification Search
CPC ............................ H04W 52/367; H04W 52/04
USPC ......................................................... 370/328
See application file for complete search history.

(56) References Cited

U.S. PATENT DOCUMENTS

| 2009/0318180 A1* | 12/2009 | Yi et al. .......................... 455/522 |
| 2010/0040030 A1* | 2/2010 | Kakumaru .................... 370/338 |
| 2010/0158147 A1* | 6/2010 | Zhang et al. ................. 375/260 |
| 2011/0092217 A1* | 4/2011 | Kim et al. ..................... 455/450 |
| 2011/0268045 A1* | 11/2011 | Heo ....................... H04L 1/0027 370/329 |
| 2012/0113824 A1* | 5/2012 | Olsson .......................... 370/252 |
| 2013/0215849 A1* | 8/2013 | Heo .................... H04W 52/365 370/329 |

* cited by examiner

*Primary Examiner* — Gerald Smarth
(74) *Attorney, Agent, or Firm* — Oliff PLC

(57) ABSTRACT

Disclosed are a method and device for reporting, in a carrier aggregation scenario, the configurable maximum transmission power of a UE carrier. Application of the technical solution as put forth in embodiments of the present invention enables a base station to accurately ascertain the A-MPR/MPR of a UE in a situation in which various resources are being allocated by including the configurable maximum transmission power of a UE carrier in a PHR MA CCE, and thereby more accurately perform UE scheduling

15 Claims, 7 Drawing Sheets

R/R/E/LCID sub-header

| Cell bitmap PH Optional |||
|---|---|---|
| P<sub>CMAX,c</sub> (Pcell) |||
| R | R | Type1 PH (Pcell) |
| R | R | Type1 PH (Scell_1) |
| R | R | Type1 PH (Scell_3) |

Figure 4

| Cell bitmap PH (optional) |||
|---|---|---|
| P<sub>CMAX,c</sub> Pcell |||
| P<sub>CMAX,c</sub> Scell_1 |||
| P<sub>CMAX,c</sub> Scell_3 |||
| R | R | Type1 PH (Pcell) |
| R | R | Type1 PH (Scell_1) |
| R | R | Type1 PH (Scell_3) |

Figure 5

| Cell bitmap PH (optional) |||
|---|---|---|
| P<sub>CMAX,c</sub> Pcell |||
| P<sub>CMAX,c</sub> Scell_3 |||
| R | R | Type1 PH (Pcell) |
| R | R | Type1 PH (Scell_1) |
| R | R | Type1 PH (Scell_3) |

Figure 6

| Cell bitmap( PH)(Optional) |  |  |
|---|---|---|
| PCMAX,C cell number indication domain | | |
| Cell bitmap (PCMAX,C cell 1) | | |
| Cell bitmap (PCMAX,C cell 2) | | |
| PCMAX,C (PCMAX,C cell 1) | | |
| PCMAX,C (PCMAX,C cell 2) | | |
| R | R | Type1 PH (Pcell) |
| R | R | Type1 PH (Scell_1) |
| R | R | Type1 PH (Scell_3) |

Figure 7

| Cell bitmap( PH)(Optional) |  |  |
|---|---|---|
| PCMAX,C (PCMAX,C cell 2) | | |
| PCMAX,C (PCMAX,C cell 1) | | |
| R | R | Type1 PH (Pcell) |
| R | R | Type1 PH (Scell_1) |
| R | R | Type1 PH (Scell_3) |

Figure 8

| Cell bitmap( PH( ( Optional( |  |  |
|---|---|---|
| P$_{CMAX,c}$ (Pcell type1) | | |
| P$_{CMAX,c}$ (Pcell type2) | | |
| R | R | Type2 PH (Pcell) |
| R | R | Type1 PH (Pcell) |
| R | R | Type1 PH (Scell_1) |
| R | R | Type1 PH (Scell_3) |

Figure 9

| Cell bitmap | PH | | Optional |
|---|---|---|---|
| $P_{CMAX,c}$ (Pcell) ||||
| R | R | Type2 PH (Pcell) ||
| R | R | Type1 PH (Pcell) ||
| R | R | Type1 PH (Scell_1) ||
| R | R | Type1 PH (Scell_3) ||

Figure 10

| Cell bitmap | PH | (optional) |
|---|---|---|
| $P_{CMAX,c}$ Pcell type1 |||
| $P_{CMAX,c}$ Pcell type2 |||
| $P_{CMAX,c}$ Scell_1 type1 |||
| $P_{CMAX,c}$ Scell_3 type1 |||
| R | R | Type2 PH (Pcell) |
| R | R | Type1 PH (Pcell) |
| R | R | Type1 PH (Scell_1) |
| R | R | Type1 PH (Scell_3) |

Figure 11

| Cell bitmap | PH | (optional) |
|---|---|---|
| $P_{CMAX,c}$ Pcell type |||
| $P_{CMAX,c}$ Scell_1 type1 |||
| $P_{CMAX,c}$ Scell_3 type1 |||
| R | R | Type2 PH (Pcell) |
| R | R | Type1 PH (Pcell) |
| R | R | Type1 PH (Scell_1) |
| R | R | Type1 PH (Scell_3) |

Figure 12

| Cell bitmap PH (optional) |
|---|
| P<sub>CMAX,c</sub> Pcell type1 |
| P<sub>CMAX,c</sub> Pcell type2 |
| P<sub>CMAX,c</sub> Scell_3 type1 |
| R | R | Type2 PH (Pcell) |
| R | R | Type1 PH (Pcell) |
| R | R | Type1 PH (Scell_3) |

Figure 13

| CC bitmap PH (Optional) |
|---|
| PCMAX,C cell number indication domain |
| CC BITMAP (PCMAX,C cell 1) |
| CC BITMAP (PCMAX,C cell 2) |
| PCMAX,C (PCMAX,C cell 1) |
| PCMAX,C (PCMAX,C cell 2) |
| R | R | Type2 PH (Pcell) |
| R | R | Type1 PH (Pcell) |
| R | R | Type1 PH (Scell_1) |
| R | R | Type1 PH (Scell_3) |

Figure 14

| CC bitmap PH (Optional) |
|---|
| PCMAX,C (PCMAX,C cell 1) |
| PCMAX,C (PCMAX,C cell 2) |
| R | R | Type2 PH (Pcell) |
| R | R | Type1 PH (Pcell) |
| R | R | Type1 PH (Scell_1) |
| R | R | Type1 PH (Scell_3) |

Figure 15

METHOD AND DEVICE FOR REPORTING CONFIGURABLE MAXIMUM TRANSMISSION POWER OF UE CARRIER

CROSS REFERENCE TO RELATED APPLICATIONS

This application is the National Stage of PCT/CN2011/081797 filed on 4 Nov. 2011, which claims priority under 35 U.S.C. §119 of Application No. CN 201010537982.X filed on 5 Nov. 2010, the disclosure of which is incorporated by reference. The international application under PCT article 21(2) was not published in English.

FIELD OF THE PRESENT INVENTION

The present invention relates to the field of communication technology, in particular to a method and device for reporting configurable maximum transmission power of UE carrier.

BACKGROUND OF THE PRESENT INVENTION

With the development of communication technology, peak rate of a LTE-A (Long Term Evolution Advanced) system is greatly improved compared with a LTE (Long Term Evolution) system, which is required to be 1 Gbps for downlink and 500 Mbps for uplink. Meanwhile, the LTE-A system is required to be compatible well with the LTE system. With an aim of improving the peak rate, the compatibility with the LTE-A system and sufficiently utilizing spectrum resource, a CA (Carrier Aggregation) technology is introduced for the LTE-A system.

In the CA technology, a terminal can work on a plurality of cells at the same time, and a cell can comprise a pair of UL/DL (Uplink/Downlink) CC (Component Carrier) or can only contain the unidirectional UL or DL carrier, instead of the mode only one suit of carrier is included in the LTE system and previous radio communication system. In the CA system, all CCs can either be continuous or discontinuous, and bandwidth of every CC can either be the same or different. To be compatible with the LTE system, the maximum bandwidth of every CC is limited as 20 MHz, and the maximum number of the CC is generally considered as 5 at present.

In addition, the cell of the LTE-A system is classified into:

(1) Primary cell. Only one cell of the cells of UE carrier is defined as Primary cell, PCell for short.

(2) Secondary cell refers to other cells of UE carrier except the Primary cell, SCell for short.

The Primary cell is selected by a base station and is configured for a terminal through RRC (Radio Resource Control) signaling. Different terminals may have different Primary cells. A PUCCH (Physical Uplink Control Channel) is configured on the UL CC of the Primary cell, rather than the UL CC of the Secondary cell.

PHR (Power Headroom Reporting) is a mechanism the UE reporting the difference between the maximum power and the actual sending power of the UE to the base station.

In a LTE Rel-8/9 system, a PH (Power Headroom) is defined aiming to a PUSCH (Physical Uplink Shared Channel) as below:

$$PH = P_{cmax,c} - P_{PUSCH}$$

Wherein, $P_{cmax,c}$ represents the allowable maximum transmission power in the circumstance the terminal meeting a RF indicator.

$P_{PUSCH}$ represents the actual transmission power of the terminal.

In the LTE Rel-8/9 system, the PH is reported through a PHR MAC CE. The PHR MAC CE comprises a MAC subhead and a MAC CE; the structural diagram of the MAC subhead and the MAC CE is respectively shown in FIG. 1 and FIG. 2.

Wherein, meanings of all domains are as follows:

A LCID (Logical Channel Identity) domain: is used to indentify the logical channel of the corresponding load part. For PHR process, the corresponding load part identified by the LCID is PH. The LCID corresponding to the LTE Rel-8/9 PHR is 11010. As shown in Table 1:

TABLE 1

| UL LCID Identification | |
|---|---|
| Index | LCID values |
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

Wherein,

E domain: extended byte, is used to instruct which one the next byte is, the MAC subhead or the MAC load?

R domain: reserved byte.

PH domain: power headroom domain, is used to bear PH value.

Furthermore, description of the PHR mechanism of the LTE-A system is made as below:

The PH of the LTE-A system is calculated and reported based on the cell. Once the PHR of a cell is triggered, it is required to report the PH information of all configured and activated cells. While real PUSCH/PUCCH transmission is not certainly provided on the activated cell, so a virtual PUCCH/PUSCH format is introduced in the LTE-A system. When PUCCH/PUSCH transmission is not really performed on an activated cell, the PH value on the cell can be calculated with the virtual PUCCH/PUSCH. Detailed format of the virtual PUCCH/PUSCH is specified in physical layer protocol and will not be to introduced hereby.

Different types of PH are defined in the LTE-A system for the Primary cell and the Secondary cell, viz. Type 1 PH and Type 2 PH. The details are as below:

For the PCell, if it is configured on the RRC layer that the PUCCH and PUSCH transmission are not allowed simultaneously, it only needs to report Type 1 PH on the PCell; otherwise, Type 1 PH and Type 2 PH are always reported on the PCell at a time;

For the SCell, only Type 1 PH is reported thereof since the PUCCH is unavailable.

Type1 PH and Type 2 PH are calculated in the following ways:

$$PH_{PUSCH} = P_{cmax,c-1} - P_{PUSCH} \qquad \text{Type 1}$$

$$PH_{PUCCH+PUSCH} = P_{cmax,c-2} - P_{PUSCH} - P_{PUCCH} \qquad \text{Type 2}$$

Meanings of all parameters in above formula are shown as below:

$P_{PUSCH}$ represents the transmission power of the PUSCH on the cell;

$P_{PUCCH}$ represents the transmission power of the PUCCH on the PCell;

$P_{cmax,c-1}$: represents the configurable maximum transmission power of UE carrier on the cell for calculating the Type 1 PH;

$P_{cmax,c-2}$: represents the configurable maximum transmission power of UE carrier on the cell for calculating the Type 2 PH;

It should be noted that, the calculation method of the $P_{cmax,c-1}$ and $P_{cmax,c-1}$ of the PCell has not been determined.

The format of the PHR MAC CE of the LTE-A system has not been finally determined, but the two principles have been determined as below:

It is required to indicate length of the PHR MAC CE in L domain in the MAC subhead corresponding to the PHR MAC CE;

The PHR MAC CE only comprises the PH on the cell activated by the UE;

Furthermore, the $P_{cmax,c}$ shall be calculated in the way regulated as below:

$$P_{CMAX\_L} - T(P_{CMAX\_L}) \le P_{cmax,c} \le P_{CMAX\_H} + T(P_{CMAX\_H})$$

Wherein, $P_{CMAX\_L} = \text{MIN}\{P_{EMAX\_L}, P_{UMAX}\}$
$P_{CMAX\_H} = \text{MIN}\{P_{EMAX\_H}, P_{PowerClass}\}$
$T(P_{CMAX\_H})$ is related to the value range of $P_{cmax,c}$, Once the value range of the $P_{cmax,c}$ is determined, the $P_{cmax,c}$ can be determined;

The $P_{EMAX\_L}$ and the $P_{EMAX\_H}$ are configured by the RRC layer based on the cell.

The $P_{UMAX}$ represents the maximum transmission power of the UE after considering an A-MPR (Additional Maximum Power Reduction)/MPR (Maximum Power Reduction).

$P_{PowerClass}$ represents the maximum transmission power of the UE without considering the A-MPR/MPR.

In the above parameters, the $P_{EMAX\_L}$ and the $P_{EMAX\_H}$ are configured by the base station, so it can be known for the base station that the $P_{PowerClass}$ has just one grade at present. Therefore, it can reckon the A-MPR/MPR really used by the UE as long as the base station knows the $P_{cmax,c}$ on a cell.

In the process realizing the embodiments of the present invention, the is applicant discovers that at least the following problems exist in prior art:

At present, the method for reporting the configurable maximum transmission power of UE carrier in the PHR MAC CE is not described in the protocol.

SUMMARY OF THE PRESENT INVENTION

The embodiments of the present invention provide a method and device for reporting configurable maximum transmission power of UE carrier, which resolves the problem how to calculate the configurable maximum transmission power of the carrier for the UE in the LTE-A system.

To achieve the above aims, the embodiments of the present invention provide a method for reporting the configurable maximum transmission power of UE carrier on one hand, comprising:

The UE judges whether it is necessary to report the configurable maximum transmission power of UE carrier to the base station through the format of the PHR MAC CE carrying the configurable maximum transmission power of UE carrier;

If yes, the UE determines the configurable maximum transmission power of UE carrier;

The UE determines the way of carrying the configurable maximum transmission power of UE carrier in the PHR MAC CE according to the current UL transmission configuration;

The UE reports the configurable maximum transmission power of UE carrier to the base station through the PHR MAC CE according to the said realization mode.

On the other hand, the embodiments of the present invention provide a UE, comprising:

Judging module, which is used to judge whether it is necessary to report the configurable maximum transmission power of UE carrier to the base station through the format of the PHR MAC CE carrying the configurable maximum transmission power of UE carrier;

Power determination module, which is used to determine the configurable maximum transmission power of UE carrier when the judging module judging as yes;

Mode determination module, which is used to determine the way of carrying the configurable maximum transmission power of UE carrier in the PHR MAC to CE according to the current UL transmission configuration;

Communication module, which is used to report the configurable maximum transmission power of UE carrier to the base station through the PHR MAC CE according to the realization mode determined by the said mode determination module.

On the other hand, the embodiments of the present invention provide a method for reporting configurable maximum transmission power of UE carrier, comprising:

The base station receives configurable maximum transmission power of UE carrier reported by the UE through the PHR MAC CE;

The base station determines the cell information the configurable maximum transmission power of UE carrier attributed to according to the information carried in the PHR MAC CE and/or current network configuration of the UE.

On the other hand, the embodiments of the present invention provide a base station, comprising:

Receiving module, which is used to receive the configurable maximum transmission power of UE carrier reported by the UE through the PHR MAC CE;

Determination module, which is used to determine the cell information the configurable maximum transmission power of UE carrier attributed to according to the information carried in the PHR MAC CE and/or current network configuration of the UE received by the said receiving module.

Comparing with the prior art, the embodiments of the present invention include the following advantages:

Upon application of the technical solution in embodiments of the present invention, it can report the information to the base station by carrying the configurable maximum transmission power of UE carrier in the PHR MAC CE to enable the base station to accurately ascertain the A-MPR/MPR of the UE in a situation in which various resources are being allocated by and thereby more accurately perform UE scheduling.

BRIEF DESCRIPTION OF THE DRAWINGS

FIGS. 4-15 are structural diagrams of format example of PHR MAC CE in the specific implementation scenario put forth in the embodiments of the present invention;

DETAILED DESCRIPTION OF THE EMBODIMENTS OF THE PRESENT INVENTION

As described in the background of the present invention, the CA technology is introduced in the LTE-A system with an aim of supporting higher peak rate. Since it is allowed to transmit UL on a plurality of CCs in the CA system and the PUSCH and PUCCH transmission in parallel may be allowed on the PCell, value of the A-MPR/MPR in the CA system changes greatly compared to the LTE system; the prior technical solution cannot accurately report the impact aroused by the A-MPR/MPR to the base station to further affect the accuracy of scheduling.

To enable the base station to learn the A-MPR/MPR information of the UE more accurately to schedule UL more reasonably, a solution is to enable the UE to carry the configurable maximum transmission power of UE carrier (represented as $P_{cmax,c}$ for simple description) on a or a plurality of cell (s) when reporting the PHR MAC CE.

Hence, the embodiments of the present invention provide a technical solution on how to report the $P_{cmax,c}$ in the PHR MAC CE.

Figure 1:
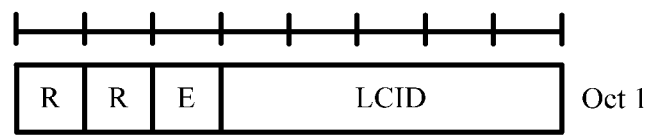
FIG. 1 is a structural diagram of the MAC subhead corresponding to the PHR MAC CE in prior art.
Figure 2:
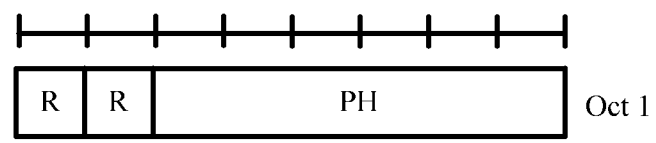
FIG. 2 is a structural diagram of the PHR MAC CE in prior art.
Figure 3:
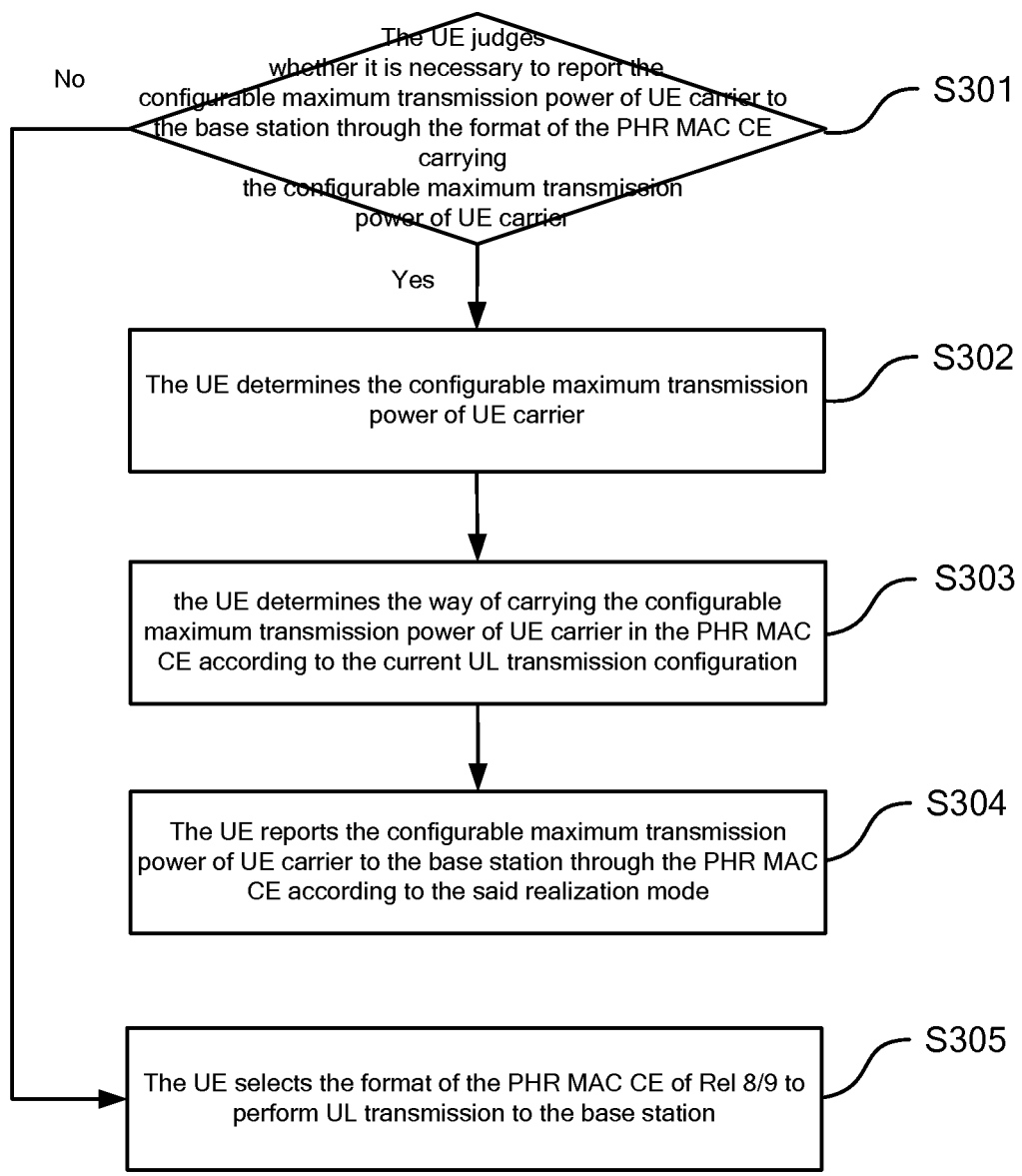
FIG. 3 is a flow diagram of a method for reporting configurable maximum transmission power of UE carrier put forth in the embodiments of the present invention.

FIG. 3 is the flow diagram of a method for reporting configurable maximum transmission power of UE carrier put forth in the embodiments of the present invention, comprising the following steps:

Step S301, the UE judges whether it is necessary to report the configurable maximum transmission power of UE carrier to the base station through the format of the PHR MAC CE carrying the configurable maximum transmission power of UE carrier.

The UE of diversified versions may be available in a network, including the UE supporting the CA and the UE not supporting the CA. The UE not supporting the CA adopts the format of the PHR MAC CE of R8/9. It is necessary to determine when to report the configurable maximum transmission power of UE carrier to the base station by using the PHR MAC CE format carrying the configurable maximum transmission power of UE carrier through Step S301.

If yes, execute Step S302;
If no, execute Step S305.

In practical application, judging mode in this step comprises the following three kinds specifically:

Mode I, the UE judges whether it is necessary to report the configurable maximum transmission power of UE carrier to the base station through the format of the PHR MAC CE carrying the configurable maximum transmission power of UE carrier according to the current network configuration, specifically comprising:

(1) If number of the cell the base station configures for the UE in a cell assembly or the cell activated is greater than 1, the UE judges it is necessary is to report the configurable maximum transmission power of UE carrier to the base station through the format of the PHR MAC CE carrying the configurable maximum transmission power of UE carrier.

(2) If number of the cell the base station configures for the UE in a cell assembly or the cell activated is equal to 1, and the UE configured by the base station allows parallel transmission of PUCCH and PUSCH or the UE configured by the base station supports discontinuous PUSCH transmission or the UE supports the discontinuous PUSCH transmission, the UE judges it is necessary to report the configurable maximum transmission power of UE carrier to the base station through the format of the PHR MAC CE carrying the configurable maximum transmission power of UE carrier.

That is to report Type1 PH+Type2 PH+$P_{cmax,c}$ to the base station.

(3) If number of the cell the base station configures for the UE in a cell assembly or the cell activated is equal to 1, and the UE configured by the base station does not allow parallel transmission of PUCCH and PUSCH, the UE judges it is unnecessary to report the configurable maximum transmission power of UE carrier to the base station through the format of the PHR MAC CE carrying the configurable maximum transmission power of UE carrier according to the current network configuration.

Mode II, the UE judges whether it is necessary to report the configurable maximum transmission power of UE carrier to the base station through the format of the PHR MAC CE carrying the configurable maximum transmission power of UE carrier according to the indication information sent by the base station.

The UE judges whether it is necessary to report the configurable maximum transmission power of UE carrier to the base station through the format of the PHR MAC CE carrying the configurable maximum transmission power of UE carrier according to the indication information carried in the RRC signaling or MAC signaling sent by the base station.

A specific and typical realization mechanism in Mode II is:

The base station determines which format of the PHR MAC CE should be used by the UE and then indicates it to the UE through the RRC signaling or MAC signaling. Of course, other realization mechanisms can also be used.

Mode III, the UE judges whether it is necessary to report the configurable maximum transmission power of UE carrier to the base station through the format of the PHR MAC CE carrying the configurable maximum transmission power of UE carrier based on whether the UE supports CA transmission.

If the UE supports CA transmission, the UE judges it is necessary to report the configurable maximum transmission power of UE carrier to the base station through the format of the PHR MAC CE carrying the configurable maximum transmission power of UE carrier based on whether the UE supports CA transmission;

If the UE does not support CA transmission, the UE judges it is unnecessary to report the configurable maximum transmission power of UE carrier to the base station through the format of the PHR MAC CE carrying the configurable maximum transmission power of UE carrier based on whether the UE supports CA transmission.

It allows judging with any of the modes abovementioned based on actual demand in practical application. The change of the technical solution caused by different judging types selected does not affect the protective range of the present invention.

Step S302, the UE determines the configurable maximum transmission power of UE carrier.

For the cell (including the PCell and the SCell) requiring reporting Type 1 PH, the UE determines the configurable maximum transmission power of UE carrier used to calculate the Type1 PH of the cell according to the impact of the A-MPR/MPR caused by real PUSCH transmission in all cells;

For the PCell requiring reporting Type 2 PH, the UE determines the configurable maximum transmission power of UE carrier used to calculate the Type 2 PH of the cell according to the impact of the A-MPR/MPR caused by real PUSCH and PUCCH transmission in all cells.

Step S303, the UE determines the way of carrying the configurable maximum transmission power of UE carrier in the PHR MAC CE according to the current UL transmission configuration.

The UE determines the way of carrying the configurable maximum transmission power of UE carrier in the PHR MAC CE based on whether the base station configures that the UE can transmit on the PUCCH and the PUSCH simultaneously.

In practical application, this step is realized in the specific process as below:

The UE determines the way of carrying the configurable maximum transmission power of UE carrier in the PHR MAC CE according to the indication information whether PUCCH and PUSCH transmission is allowed for the UE simultaneously carried in the RRC signaling sent by the base station.

In this step, it is specifically processed in the following two cases:

Case I, when the UE configured by the base station cannot perform PUCCH and PUSCH transmission simultaneously, the way of carrying the configurable maximum transmission power of UE carrier in the PHR MAC CE determined by the UE specifically comprises:

(1) The configurable maximum transmission power of UE carrier of a PCell used to calculate Type1 PH is carried in the PHR MAC CE.

Under this realization mode, it is unnecessary to display and indicate is information of the cell the configurable maximum transmission power of UE carrier attributed to in the PHR MAC CE since the PCell is unique.

(2) Only one configurable maximum transmission power of UE carrier used to calculate Type1 PH is carried in the PHR MAC CE for each cell.

Wherein, the configurable maximum transmission power of UE carrier of all cells shares the same arrange sequence in the PHR MAC CE as the maximum transmission power of all cells in the PHR MAC CE.

Under this realization mode, it is unnecessary to display and indicate information of the cell the configurable maximum transmission power of UE carrier attributed to in the PHR MAC CE since the arrange sequence of the configurable maximum transmission power of UE carrier is the same as that of the maximum transmission power.

(3) Determine the configurable maximum transmission power of UE carrier used to calculate Type1 PH should be carried in the PHR MAC CE according to the indication information sent by eNB.

Under this realization mode, it is unnecessary to display and indicate information of the cell the configurable maximum transmission power of UE carrier attributed to in the PHR MAC CE since the cell the specifically reported configurable maximum transmission power of UE carrier attributed to and the arrange sequence are basically specified.

Furthermore, as an optimization treatment mode of (2) above-mentioned, when the way of carrying the configurable maximum transmission power of UE carrier in the PHR MAC CE determined by the UE is that only one configurable maximum transmission power of UE carrier is carried in the PHR MAC CE for each cell and if the UE determines the configurable maximum transmission power of UE carrier of a plurality of cells is the same, only one configurable maximum transmission power of UE carrier is carried in the PHR MAC CE for those cells.

Wherein, if the base station can determine indistinctly which cells have the same configurable maximum transmission power of UE carrier (such as whether the $P_{EMAX\_L}$, $P_{EMAX\_H}$, the $P_{PowerClass}$ and the A-MPR/MPR are determined based on the UE; wherein, the base station shall know the $P_{PowerClass}$ since it just has a grade) according to some configurations or rules, it is unnecessary to indicate which cells have the same configurable maximum transmission power of UE carrier in the PHR MAC CE.

If the base station cannot accurately determine which cells have the same $P_{CMAX,C}$, it is required to carry relevant indication information in the PHR MAC CE to indicate how many configurable maximum transmission power of UE carrier is reported totally and which cell is for every configurable maximum transmission power of UE carrier.

Case II, when the UE configured by the base station can transmit on PUCCH and PUSCH simultaneously, the way of carrying the configurable maximum transmission power of UE carrier in the PHR MAC CE determined by the UE, specifically comprises:

(1) The configurable maximum transmission power of UE carrier of the PCell is carried in the PHR MAC CE.

Wherein, the configurable maximum transmission power of UE carrier of the PCell including the configurable maximum transmission power of UE carrier which is used to calculate the type1 PH and the configurable maximum power of UE carrier which is used to calculate the type2 PH.

Under this realization mode, it is unnecessary to display and indicate information of the cell the configurable maximum transmission power of UE carrier attributed to in the PHR MAC CE since the PCell is unique.

In case of no real PUCCH transmission for the UE, reporting of the configurable maximum transmission power of UE carrier of the PCell can be optimized, viz. it can only report one configurable maximum transmission power of UE carrier since the configurable maximum transmission power of to UE carrier of the PCell respectively used to calculate Type1 PH and Type2 PH is the same.

(2) At least a configurable maximum transmission power of UE carrier is carried in the PHR MAC CE for each cell.

For the PCell, configurable maximum transmission power of UE carrier is respectively used to calculate Type1 PH and Type 2 PH is carried in the PHR MAC CE; for SCell, configurable maximum transmission power of UE carrier used to calculate Type1 PH is carried in the PHR MAC CE.

In case of no real PUCCH transmission for the UE, reporting of the configurable maximum transmission power of UE carrier of the PCell can be optimized, viz. it can only report one configurable maximum transmission power of UE carrier since the configurable maximum transmission power of UE carrier of the PCell respectively used to calculate Type1 PH and Type2 PH is the same.

Wherein, the configurable maximum transmission power of UE carrier of all cells shares the same arrange sequence in the PHR MAC CE as the maximum transmission power of all cells in the PHR MAC CE.

Under this realization mode, it is unnecessary to display and indicate information of the cell the configurable maximum transmission power of UE carrier attributed to in the PHR MAC CE since the arrange sequence of the configurable maximum transmission power of UE carrier is the same as that of the maximum transmission power.

(3) Determine the configurable maximum transmission power of UE carrier should be carried in the PHR MAC CE according to the indication information sent by eNB.

Wherein, when the indication information of the base station indicates to carry is the configurable maximum transmission power of UE carrier of the PCell, the configurable maximum transmission power of UE carrier respectively used to calculate Type1 PH and Type2 PH is carried in the PHR MAC CE; when the indication information of the base station indicates to carry the configurable maximum transmission power of UE carrier of the SCell, the configurable maximum transmission power of UE carrier used to calculate Type1 PH is carried in the PHR MAC CE.

In case of no real PUCCH transmission for the UE, reporting of the configurable maximum transmission power of UE carrier of the PCell can be optimized, viz. it can only report one configurable maximum transmission power of UE carrier since the configurable maximum transmission power of UE carrier of the PCell respectively used to calculate Type1 PH and Type2 PH is the same.

Under this realization mode, it is unnecessary to display and indicate information of the cell the configurable maximum transmission power of UE carrier attributed to in the PHR MAC CE since the cell the specifically reported configurable maximum transmission power of UE carrier attributed to and the arrange sequence are basically specified.

Furthermore, as an optimization treatment mode of (2) above-mentioned, when the way of carrying the configurable maximum transmission power of UE carrier in the PHR MAC CE determined by the UE is that at least a configurable maximum transmission power of UE carrier is carried in the PHR MAC CE for each cell, there are the following special cases:

If the UE determines the configurable maximum transmission power of UE carrier used to calculate Type1 PH and Type2 PH of PCell are same, only one configurable maximum transmission power of UE carrier is carried for PCell in the PHR MAC CE, and/or, If the UE determines the configurable maximum transmission power of UE carrier of a plurality of cells is the same, only one configurable maximum transmission power of UE carrier is carried for a plurality of cells in the PHR MAC CE.

Wherein, if the base station can determine indistinctly which cells have the same configurable maximum transmission power of UE carrier (such as whether the $P_{EMAX\_L}$, $P_{EMAX\_H}$, the $P_{PowerClass}$ and the A-MPR/MPR are determined based on the UE; wherein, the base station shall know the $P_{PowerClass}$ since it has an only grade) according to some configurations or rules, it is unnecessary to indicate which cells have the same configurable maximum transmission power of UE carrier in the PHR MAC CE.

If the base station cannot accurately determine which cells have the same $P_{CMAX,C}$, it is required to carry relevant indication information in the PHR MAC CE to indicate how many configurable maximum transmission power of UE carrier is reported totally and which cell it is for every configurable maximum transmission power of UE carrier.

It should be further noted that in all circumstances of this step, if the A-MPR/MPR is based on the UE specified in RAN4, it is more reasonable to only report the configurable maximum transmission power of UE carrier on the PCell regardless of whether the PUCCH and PUSCH transmission is configured or not. Certainly, if the A-MPR/MPR is based on PA or a transmitter specified in the RAN4, it is not enough to only report PCMAX,C of the PCell, and it is allowed to select the other several solutions in this case.

Step S304, the UE reports the configurable maximum transmission power of UE carrier to the base station through the PHR MAC CE in accordance with the realization mode.

It should be noted that, if a BITMAP information element is included in the PHR MAC CE to indicate the PH information of which cells is comprised in the PHR MAC CE, the bit corresponding to the PCell can also be used to indicate whether the Type2 PH is calculated, according to the real PUCCH transmission or the virtual PUCCH reference format. The change does not affect the protective scope of the present invention.

Step S305, the UE selects the format of the PHR MAC CE of Rel 8/9 to perform UL transmission to the base station.

The above shows the realization flow of the method for reporting configurable maximum transmission power of UE carrier at UE side put forth in the embodiments of the present invention. Correspondingly, it needs to receive configurable maximum transmission power of UE carrier reported by the UE through the PHR MAC CE at the base station side, and determine information of the cell the configurable maximum transmission power of UE carrier attributed to in accordance with the received information carried in the PHR MAC CE and/or current network configuration of the UE.

The specific determination principle can refer to the various circumstances in Step S303 above-mentioned, and is not repeated here.

Comparing with the prior art, the embodiments of the present invention include the following advantages:

Upon application of the technical solution in embodiments of the present invention, it can report the information to the base station by carrying the configurable maximum transmission power of UE carrier in the PHR MAC CE to enable the base station to accurately ascertain the A-MPR/MPR of the UE in a situation in which various resources are being allocated by and thereby more accurately perform UE scheduling.

Description of the technical solution put forth in embodiments of the present invention is made here in combination with the specific application scenarios.

Format of Rel-8/9 PHR MAC CE is specified in the protocol, so the present invention mainly introduces the format of PHR MAC CE requiring using the additional $P_{cmax,c}$ (configurable maximum transmission power of UE carrier) information in the embodiments.

Supposing the system has three activated cells, with the number of PCell, SCell_1 and SCell_3, the embodiments of the present invention are described as below:

Embodiment 1: The possible format of the PHR MAC CE in the circumstance the base station configures that parallel transmission of the PUCCH and PUSCH is not allowed.

If only reporting $P_{cmax,c}$ on the PCell according to (1) in case I of Step S303, format of the PHR MAC CE is shown in FIG. 4.

If reporting $P_{cmax,c}$ for every cell according to (2) in case I of Step S303, format of the PHR MAC CE is shown in FIG. 5.

Determine $P_{cmax,c}$ of which cells will be reported based on RRC signaling configuration according to (3) in case I of Step S303. Supposing the base station configures through the RRC signaling that only the $P_{cmax,c}$ of the PCell and the SCell_3 is reported, format of the PHR MAC CE is shown in FIG. 6.

According to the optimization of (2) of Case I in Step S303, only one $P_{cmax,c}$ will be reported if the same $P_{cmax,c}$ is included for a plurality of cells. Supposing the $P_{cmax,c}$ calculated by the UE respectively on SCell_1 and the SCell_3 is the same, it is different from the $P_{cmax,c}$ on the PCell.

If the base station cannot determine which cells have the same $P_{cmax,c}$ indistinctly, format of the PHR MAC CE is shown in FIG. 7.

Wherein, "$P_{cmax,c}$ assembly number information element" is used to indicate how many $P_{cmax,c}$ comprised in the PHR MAC CE. Certainly, if the assembly number is limited, a certain R bit in the PHR MAC CE can be used for indication.

"Cell bitmap (PCMAX, C assembly)" indicates which cells the $P_{cmax,c}$ in the PHR MAC CE corresponds to by ways of bitmap. It should be noted that, it may need to use two bits for the PCell for bitmap to respectively show the $P_{cmax,c}$ used to calculated Type1 PH and Type2 PH.

Furthermore, if the base station can accurately learn which cells have the same $P_{cmax,c}$, format of the PHR MAC CE is shown in FIG. 8. With an aim that the base station can identify rightly which cell every $P_{cmax,c}$ is corresponded to, format of the $P_{cmax,c}$ in the PHR MAC CE can be arranged in ascending or descending sequence according to the No. of the corresponding maximum or minimum cell.

Embodiment 2: The possible format of the PHR MAC CE in the circumstance the base station configures that the parallel transmission of the PUCCH and PUSCH is allowed.

If only reporting $P_{cmax,c}$ on the PCell according to (1) in case II of Step S303, format of the PHR MAC CE is shown in FIG. 9.

In case of no real PUCCH transmission on the PCell, format of the PHR MAC CE shown in FIG. 9 can be further optimized as the format in FIG. 10:

If reporting $P_{cmax,c}$ for every cell according to (2) in case II of Step S303, format of the PHR MAC CE is shown in FIG. 11.

Every SCell of the PHR MAC CE is corresponding to a $P_{cmax,c}$, and Type1 PH and Type2 PH of the PCell are respectively corresponding to a $P_{cmax,c}$.

In case of no real PUCCH transmission, the $P_{cmax,c}$ calculated respectively with the Type1 PH and Type2 PH is the same, so format of the PHR MAC CE corresponding to FIG. 11 can be further optimized as the format shown in FIG. 12.

Determine $P_{cmax,c}$ of which cells will be reported based on RRC signaling configuration according to (3) in case I of Step S303. Supposing the base station configures through the RRC signaling that only the $P_{cmax,c}$ of the PCell and the SCell_3 is reported, format of the PHR MAC CE is shown in FIG. 13.

According to the optimization of (2) of Case II in Step S303, only one $P_{cmax,c}$ will be reported if the same $P_{cmax,c}$ is included for a plurality of cells.

Supposing the $P_{cmax,c}$ calculated by the UE respectively on SCell_1 and the SCell_3 is the same, it is different from the $P_{cmax,c}$ on the PCell, and there are 2 $P_{cmax,c}$ assemblies.

If the base station cannot determine which cells have the same $P_{cmax,c}$ indistinctly, format of the PHR MAC CE is shown in FIG. 14.

Wherein, "$P_{cmax,c}$ assembly number information element" is used to indicate how many $P_{cmax,c}$ comprised in the PHR MAC CE. Certainly, if the assembly number is limited, a certain R bit in the PHR MAC CE can be used for indication.

"Cell bitmap ($P_{cmax,c}$ assembly)" indicates which cells the $P_{cmax,c}$ in the PHR MAC CE corresponds to by ways of bitmap. It should be noted that, it may need to use two bits for the PCell for bitmap to respectively show the $P_{cmax,c}$ used to calculated Type1 PHR and Type2 PHR.

If the base station can accurately learn which cells have the same $P_{cmax,c}$, format of the PHR MAC CE is shown in FIG. 15. With an aim that the base station can identify rightly which cell every $P_{cmax,c}$ is corresponded to, format of the $P_{cmax,c}$ in the PHR MAC CE can be arranged in ascending or descending sequence according to the No. of the corresponding maximum or minimum cell.

It should be noted that, all embodiments above-mentioned are in consistent with the description below:

(1) How many bits the $P_{cmax,c}$ information element occupied finally depends on $P_{cmax,c}$ quantifying outcomes specified in RAN4 or RAN1. If the bit occupied by the $P_{cmax,c}$ after quantifying is not 8 bit, the redundant bit in every $P_{cmax,c}$ information element can be R bit for follow-up expansion. For example, R bit can be used subsequently to indicate the corresponding cell or PA.

(2) In all embodiments of the present invention, "CC bitmap (PH) (Optional) domain" is used to identify PH information of which cells is comprised in the PHR MAC CE. Whether the domain is existed is optional. If the base station can determine number and No. of the CC comprised in the PHR MAC CE indistinctly, the domain is unnecessary. Every cell occupies a bit. The PCell is activated all the time, so the bit occupied by the PCell can be used to express whether Type2 PHR exists in the PHR MAC CE.

(3) Sequence of the PH and $P_{cmax,c}$ corresponding to different cells and the Cell bitmap used to indicate which cells have the same $P_{cmax,c}$ is variable in the PHR MAC CE as long as presetting the sequence in standard, such as arranging according to SCell ascending sequence or descending sequence.

It should be further noted that, format shown in all embodiments above-mentioned and also other possible formats are not introduced here, and only typical format is described. All formats in accordance with the technical solutions put forth in embodiments of the present invention should be as the protection scope of the present invention.

Comparing with the prior art, the embodiments of the present invention include the following advantages:

Upon application of the technical solution in embodiments of the present invention, it can report the information to the base station by carrying the configurable maximum transmission power of UE carrier in the PHR MAC CE to enable the base station to accurately ascertain the A-MPR/MPR of the UE in a situation in which various resources are being allocated by and thereby more accurately perform UE scheduling.

Figure 16:
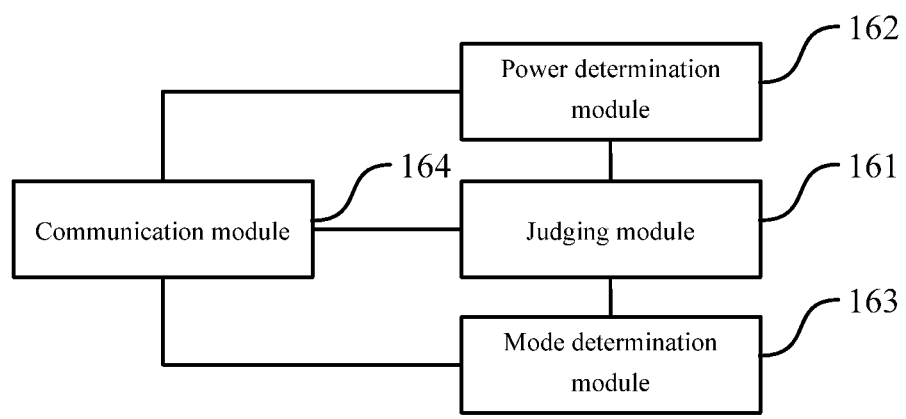
FIG. 16 is a structural diagram of a UE put forth in the embodiments of the present invention.

To realize technical solution in embodiments of the present invention, embodiments of the present invention put forth a UE, with the structural diagram is shown in FIG. 16, which specifically comprises:

Judging module 161, which is used to judge whether it is necessary to report the configurable maximum transmission power of UE carrier to the base station through the format of the PHR MAC CE carrying the configurable maximum transmission power of UE carrier;

Power determination module 162, which is used to determine the configurable maximum transmission power of UE carrier when the judging module 161 judging as yes;

Mode determination module 163, which is used to determine the way of carrying the configurable maximum transmission power of UE carrier in the PHR MAC CE according to the current UL transmission configuration;

Communication module 164, which is used to report the configurable maximum transmission power of UE carrier to the base station through the PHR MAC CE according to the realization mode determined by the mode determination module 163.

Wherein, the judging module 161 is specifically used to:

Judge whether it is necessary to report the configurable maximum transmission power of UE carrier to the base station through the format of the PHR MAC CE carrying the configurable maximum transmission power of UE carrier according to current network configuration; or, Judge whether it is necessary to report the configurable maximum transmission power of UE carrier to the base station through the format of the PHR MAC CE carrying the configurable maximum transmission power of UE carrier according to the indication message sent by the base station and received by the communication module 164; or, Judge whether it is necessary to report the configurable maximum transmission power of UE carrier to the base station through the format of the PHR MAC CE carrying the configurable maximum transmission power of UE carrier according to whether the UE supports CA transmission.

Corresponding to Mode I in Step S301, the judging module 161 is specifically used to:

Judge it is necessary to report the configurable maximum transmission power of UE carrier to the base station through the format of the PHR MAC CE carrying the configurable maximum transmission power of UE carrier if number of the cell the base station configures for the UE in a cell assembly or the cell activated is greater than 1;

Judge it is unnecessary to report the configurable maximum transmission power of UE carrier to the base station through the format of the PHR MAC CE carrying the configurable maximum transmission power of UE carrier if number of the cell the base station configures for the UE in a cell assembly is equal to 1, and the UE configured by the base station does not allow parallel transmission of PUCCH and PUSCH.

Judge it is unnecessary to report the configurable maximum transmission power of UE carrier to the base station through the format of the PHR MAC CE carrying the configurable maximum transmission power of UE carrier if number of the cell the base station configures for the UE in a cell assembly is equal to 1, and the UE configured by the base station allows parallel transmission of PUCCH and PUSCH.

Corresponding to Mode II in Step S301, the judging module 161 is specifically used to:

Judge whether it is necessary to report the configurable maximum transmission power of UE carrier to the base station through the format of the PHR MAC CE carrying the configurable maximum transmission power of UE carrier according to the indication information carried in the RRC signaling or MAC signaling sent by the base station and received by the communication module 164.

Corresponding to Mode III in Step S301, the judging module 161 is specifically used to:

If the UE supports CA transmission, the judging module 161 judges it is necessary to report the configurable maximum transmission power of UE carrier to the base station through the format of the PHR MAC CE carrying the configurable maximum transmission power of UE carrier based on whether the UE supports CA transmission;

If the UE does not support CA transmission, the judging module 161 judges it is unnecessary to report the configurable maximum transmission power of UE carrier to the base station through the format of the PHR MAC CE carrying the configurable maximum transmission power of UE carrier based on whether the UE supports CA transmission.

Furthermore, when the judging module 161 judges it is unnecessary to report the configurable maximum transmission power of UE carrier to the base station through the format of the PHR MAC CE carrying the configurable maximum transmission power of UE carrier, the communication module 164 is also used to:

Select the format of the PHR MAC CE of Rel 8/9 to perform UL transmission to the base station.

In practical application, the power determination module 162 is specifically used to:

Determine the configurable maximum transmission power of UE carrier used to calculate the Type1 PH of the cell according to the impact of the A-MPR/MPR caused by real PUSCH transmission in all cells for the cell (including the PCell and the SCell) requiring reporting Type 1 PH;

Determine the configurable maximum transmission power of UE carrier used to calculate the Type 2 PH of the cell according to the impact of the A-MPR/MPR caused by real PUSCH and PUCCH transmission in all cells for the PCell requiring reporting Type 2 PH.

In practical application, the mode determination module 163 is specifically used to:

Determine the way of carrying the configurable maximum transmission power of UE carrier in the PHR MAC CE according to the indication information whether PUCCH and PUSCH transmission is allowed for the UE simultaneously carried in the RRC signaling sent by the base station and received by the communication module 164.

The specific determination strategy is shown in Step S303, and will not be introduced here.

Figure 17:
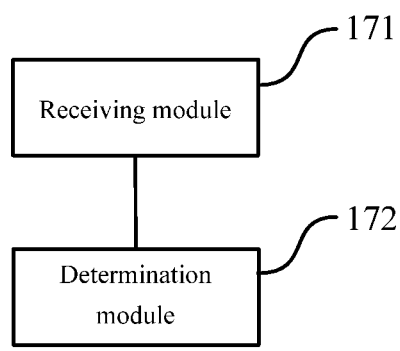
FIG. 17 is a structural diagram of a base station put forth in the embodiments of the present invention.

On the other hand, the embodiments of the present invention provide a UE, with the structural diagram shown in FIG. 17, comprising:

Receiving module 171, which is used to receive the configurable maximum transmission power of UE carrier reported by the UE through the PHR MAC CE;

Determination module 172, which is used to determine the cell information the configurable maximum transmission power of UE carrier attributed to according to the information carried in the PHR MAC CE and/or current network configuration of the UE received by the receiving module 171.

Wherein, in practical application, the determination module 172 is specifically used to:

It can transmit on PUCCH and PUSCH simultaneously according to the information of the cell the configurable maximum transmission power of UE carrier attributed to carried in the PHR MAC CE received by the receiving module 171 or quantity of the configurable maximum transmission power of UE carrier, and/or whether the UE is configured at present.

The specific determination principle can refer to the various circumstances in Step S303 above-mentioned, and is not repeated here.

Comparing with the prior art, the embodiments of the present invention include the following advantages:

Upon application of the technical solution in embodiments of the present invention, the PHR MAC CE and the corresponding MAC subhead are determined according to quantity of the UL CC requiring reporting maximum transmission power and the maximum transmission power type to be reported, and length information of the PHR MAC CE, and/or maximum transmission power information, and/or whether it is visual maximum transmission power as well as other indication information are carrier thereof to enable the base station to accurately acquire the maximum transmission power of all UL CCs, so as to solve the inapplicability of PHR MAC CE format in LTE Rel-8/9 to the LTE-A system at present.

Through the description of the embodiments above, the technical personnel in this field can understand clearly that the present invention can be implemented by hardware or software and necessary current hardware platform. Based on this understanding, the technical solution of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for reporting a configurable maximum transmission power of a User Equipment (UE) carrier, comprising:
   a UE judging whether to report the configurable maximum transmission power of the UE carrier to a base station through a format of a Power Headroom Report Medium Access Control Control Element (PHR MAC CE) carrying the configurable maximum transmission power of the UE carrier, based on:
      an indication information carried in Radio Resource Control (RRC) signaling or Medium Access Control (MAC) signaling sent by the base station;
      a current network configuration, whereby:
         the UE makes a judgment to report when:
            a number of a cell the base station configures for the UE in a cell assembly or a cell activated is greater than 1; or
            the number of the cell the base station configures for the UE in a cell assembly or the cell activated is equal to 1, and the UE and base station allow parallel transmission of Physical Uplink Control Channel (PUCCH) and Physical Uplink Shared Channel (PUSCH) or the UE and base station support discontinuous PUSCH transmission or the UE supports the discontinuous PUSCH transmission; and
         the UE makes a judgment to not report when:
            the number of the cell the base station configures for the UE in the cell assembly or the cell activated is equal to 1, and the UE and base station do not allow parallel transmission of PUCCH and PUSCH; or
      whether the UE supports Carrier Aggregation (CA) transmission, whereby:
         the UE makes the judgment to report when the UE supports CA transmission; and
         the UE makes the judgment to not report when the UE does not support CA transmission;
   the UE determining the configurable maximum transmission power of the UE carrier;
   the UE determining a way of carrying the configurable maximum transmission power of the UE carrier in the PHR MAC CE according to a current Uplink (UL) transmission configuration; and
   the UE reporting the configurable maximum transmission power of the UE carrier to the base station through the PHR MAC CE according to a realization mode.

2. The method of claim 1, wherein, when the UE makes the judgment to report based on the current network configuration, the UE selects the format of the PHR MAC CE of Rel 8/9 to perform UL transmission to the base station.

3. The method of claim 1, wherein, the UE determining the configurable maximum transmission power of the UE carrier specifically comprises:
   for a cell requiring reporting Power Headroom Type 1 (Type 1 PH), calculating the Type 1 PH of the cell according to an impact of an Additional Maximum Power Reduction/Maximum Power Reduction (A-MPR/MPR) caused by real PUSCH transmission in all cells;
   for a Parameterized Cell (PCell) requiring reporting Type 2 PH, calculating the Type 2 PH of the cell according to the impact of the A-MPR/MPR caused by real PUSCH and PUCCH transmission in all cells.

4. The method of claim 1, wherein the UE determines the way of carrying the configurable maximum transmission power of the UE carrier in the PHR MAC CE according to the current UL transmission configuration based on whether the base station configures that the UE can transmit on a PUCCH and a PUSCH simultaneously.

5. The method of claim 4, wherein the UE determines the way of carrying the configurable maximum transmission power of the UE carrier in the PHR MAC CE based on the indication information whether PUCCH and PUSCH simultaneous transmission is allowed for the UE carried in the RRC signaling sent by the base station.

6. The method of claim 4, wherein, when the UE and base station cannot perform PUCCH and PUSCH transmission simultaneously, the way of carrying the configurable maximum transmission power of the UE carrier in the PHR MAC CE determined by the UE specifically comprises:
   only one configurable maximum transmission power of the UE carrier used to calculate a Type 1 PH of the PCell is carried in the PHR MAC CE;
   only one configurable maximum transmission power of the UE carrier used to calculate Type 1 PH is carried in the PHR MAC CE for each cell; or
   cells whose configurable maximum transmission power of the UE carrier used to calculate Type 1 PH that should be carried in the PHR MAC CE according to the indication information sent by eNodeB (eNB) are determined.

7. The method of claim 6, wherein, when the way of carrying the configurable maximum transmission power of the UE carrier in the PHR MAC CE determined by the UE is that only one configurable maximum transmission power of the UE carrier is carried in the PHR MAC CE for each cell, the method also comprises:

when the UE determines that the configurable maximum transmission power of the UE carrier of a plurality of cells is equal, only one configurable maximum transmission power of the UE carrier is carried in the PHR MAC CE for those cells.

8. The method of claim 4, wherein, when the UE configured by the base station can transmit on PUCCH and PUSCH simultaneously, the way of carrying the configurable maximum transmission power of the UE carrier in the PHR MAC CE determined by the UE, specifically comprises:

the configurable maximum transmission power of the UE carrier of the PCell is carried in the PHR MAC CE, wherein, the configurable maximum transmission power of the UE carrier of the PCell including the configurable maximum transmission power of the UE carrier which is used to calculate the Type 1 PH and the configurable maximum power of the UE carrier which is used to calculate the Type 2 PH;

at least a configurable maximum transmission power of the UE carrier is carried in the PHR MAC CE for each cell, wherein, for the PCell, configurable maximum transmission power of the UE carrier used to calculate Type 1 PH and configurable maximum transmission power of the UE carrier used to calculate Type 2 PH are carried in the PHR MAC CE; for SCell, configurable maximum transmission power of the UE carrier used to calculate Type 1 PH is carried in the PHR MAC CE; or determining the configurable maximum transmission power of the UE carrier should be carried in the PHR MAC CE according to the indication information sent by eNB, wherein, when the indication information of the base station indicates to carry the configurable maximum transmission power of the UE carrier of the PCell, the configurable maximum transmission power used to calculate Type 1 PH and Type 2 PH respectively are carried in the PHR MAC CE; when the indication information of the base station indicates to carry the configurable maximum transmission power of the UE carrier of the SCell, the configurable maximum transmission power of the UE carrier used to calculate Type 1 PH is carried in the PHR MAC CE.

9. The method of claims 8, wherein, when only one configurable maximum transmission power of the UE carrier used to calculate Type 1 PH is carried in the PHR MAC CE for each cell, the method also comprises:

in the PHR MAC CE, the configurable maximum transmission power of the UE carrier of all cells shares a same arrange sequence in the PHR MAC CE as the maximum transmission power of all cells in the PHR MAC CE.

10. The method of claim 8, wherein, when the way of carrying the configurable maximum transmission power of the UE carrier in the PHR MAC CE determined by the UE is that only one configurable maximum transmission power of the UE carrier is carried in the PHR MAC CE for each cell, the method also comprises:

when the UE determines that the configurable maximum transmission power of the UE carrier used to calculate the Type 1 PH and Type 2 PH of PCell are equal, only one configurable maximum transmission power of the UE carrier is carried in the PHR MAC CE for PCell; or when the UE determines that the configurable maximum transmission power of the UE carrier of a plurality of cells is equal, only one configurable maximum transmission power of the UE carrier is carried in the PHR MAC CE for those cells.

11. The method of claims 10, wherein, when only one configurable maximum transmission power of the UE carrier is carried for a plurality of cells in the PHR MAC CE, the method also comprises:

when the base station can determine which cell the configurable maximum transmission power of the UE carrier carried in the PHR MAC CE is attributed to, the UE makes a judgment to not report which cell the configurable maximum transmission power is attributed to; or when the base station cannot determine which cell the configurable maximum transmission power of the UE carrier carried in the PHR MAC CE is attributed to, the UE makes a judgment to report which cell the configurable maximum transmission power is attributed to.

12. The method of claim 1, wherein, comprising:

when a BITMAP information element is included in the PHR MAC CE to indicate the PH information of which cells are carried in the PHR MAC CE, a bit corresponding to the PCell can also be used to indicate whether a Type 2 PH is calculated according to the real PUCCH transmission or a virtual PUCCH reference format.

13. A User Equipment (UE), comprising:

a judging module that judges whether to report a configurable maximum transmission power of a UE carrier to a base station through a format of a Power Headroom Report Medium Access Control Control Element (PHR MAC CE) carrying the configurable maximum transmission power of the UE carrier, the judging module judging according to a current network configuration, according to an indication message sent by the base station and received by a communication module of the UE, according to indication information carried in Radio Resource Control (RRC) signaling or Medium Access Control (MAC) signaling sent by the base station and received by the communication module, or according to whether the UE supports Carrier Aggregation (CA) transmission, whereby:

the UE makes a judgment to report when:
a number of a cell the base station configures for the UE in a cell assembly or a cell activated is greater than 1, or
the number of the cell the base station configures for the UE in the cell assembly is equal to 1, and the UE and base station allow parallel transmission of Physical Uplink Control Channel (PUCCH) and Physical Uplink Shared Channel (PUSCH), or the UE and base station support discontinuous PUSCH transmission or the UE supports the discontinuous PUSCH transmission, and the UE makes a judgment to not report when:
the number of the cell the base station configures for the UE in the cell assembly is equal to 1, and the UE and base station do not allow parallel transmission of PUCCH and PUSCH;

a power determination module that is used to determine the configurable maximum transmission power of the UE carrier when the judging module makes the judgment to report the configurable maximum transmission power;

a mode determination module that is used to determine a way of carrying the configurable maximum transmission power of the UE carrier in the PHR MAC CE according to a current Uplink (UL) transmission configuration; and the communication module that is used to report the configurable maximum transmission power of the UE carrier to the base station through the PHR MAC CE according to a realization mode determined by the mode determination module.

14. The UE of claim 13, wherein the mode determination module is specifically used to:
    determine the way of carrying the configurable maximum transmission power of the UE carrier in the PHR MAC CE according to the indication information whether simultaneous PUCCH and PUSCH transmission is allowed for the UE carried in the RRC signaling sent by the base station and received by the communication module.

15. A method for reporting a configurable maximum transmission power of a User Equipment (UE) carrier, comprising:
    a UE judging whether to report the configurable maximum transmission power of the UE carrier to a base station through a format of a Power Headroom Report Medium Access Control Control Element (PHR MAC CE) carrying the configurable maximum transmission power of the UE carrier, and when a judgment is made to report:
        the UE determining the configurable maximum transmission power of the UE carrier, whereby:
            for a cell requiring reporting Power Headroom Type 1 (Type 1 PH), the UE determines the configurable maximum transmission power of the UE carrier used to calculate the Type 1 PH of the cell according to an impact of an Additional Maximum Power Reduction/Maximum Power Reduction (A-MPR/MPR) caused by real Physical Uplink Shared Channel (PUSCH) transmission in all cells, and
            for a Parameterized Cell (PCell) requiring reporting Power Headroom Type 2 (Type 2 PH), the UE determines the configurable maximum transmission power of the UE carrier used to calculate the Type 2 PH of the cell according to the impact of the A-MPR/MPR caused by real PUSCH and Physical Uplink Control Channel (PUCCH) transmission in all cells;
    the UE determining a way of carrying the configurable maximum transmission power of the UE carrier in the PHR MAC CE according to a current Uplink (UL) transmission configuration; and
    the UE reporting the configurable maximum transmission power of the UE carrier to the base station through the PHR MAC CE according to a realization mode.

* * * * *